(12) United States Patent
Shirakawa

(10) Patent No.: US 7,626,623 B2
(45) Date of Patent: Dec. 1, 2009

(54) SIGNAL PROCESSING APPARATUS, SIGNAL PROCESSING METHOD, PROGRAM, AND STORAGE MEDIUM EMPLOYING RANDOM NUMBER GENERATION

(75) Inventor: Yusuke Shirakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 716 days.

(21) Appl. No.: 10/938,367

(22) Filed: Sep. 9, 2004

(65) Prior Publication Data
US 2005/0052555 A1 Mar. 10, 2005

(30) Foreign Application Priority Data
Sep. 9, 2003 (JP) ............... 2003-317325

(51) Int. Cl.
*H04N 5/335* (2006.01)
(52) U.S. Cl. .................... 348/302
(58) Field of Classification Search .............. 348/241, 348/243, 222.1, 294–324; 382/270–273; 358/3.26, 3.01, 530
See application file for complete search history.

(56) References Cited

U.S. PATENT DOCUMENTS

| | | | | |
|---|---|---|---|---|
| 5,121,446 A | * | 6/1992 | Yamada et al. | 382/272 |
| 5,153,925 A | * | 10/1992 | Tanioka et al. | 382/272 |
| 5,394,250 A | * | 2/1995 | Shono | 358/3.03 |
| 6,049,355 A | * | 4/2000 | Kameyama | 348/241 |
| 6,145,950 A | * | 11/2000 | Ohtsuka et al. | 347/15 |
| 6,157,407 A | * | 12/2000 | Kobayashi | 348/241 |
| 6,236,769 B1 | * | 5/2001 | Desai | 382/308 |
| 6,347,115 B1 | * | 2/2002 | Lin et al. | 375/240 |
| 6,791,607 B1 | * | 9/2004 | Bilhan et al. | 348/243 |
| 6,952,240 B2 | * | 10/2005 | Gower et al. | 348/678 |
| 6,996,282 B1 | * | 2/2006 | Kondo et al. | 382/239 |
| 7,020,283 B1 | * | 3/2006 | Wada et al. | 380/46 |
| 7,095,448 B2 | * | 8/2006 | Zhou et al. | 348/576 |
| 2003/0052982 A1 | * | 3/2003 | Chieh | 348/302 |
| 2003/0231348 A1 | * | 12/2003 | Ishii et al. | 358/3.03 |
| 2004/0001164 A1 | * | 1/2004 | Murakami | 348/607 |
| 2004/0189839 A1 | * | 9/2004 | McDermott | 348/243 |

FOREIGN PATENT DOCUMENTS

JP 62-046104 B 9/1987
JP 9-284595 10/1997

* cited by examiner

*Primary Examiner*—Tuan Ho
*Assistant Examiner*—Kent Wang
(74) *Attorney, Agent, or Firm*—Cowan, Liebowitz & Latman, P.C.

(57) ABSTRACT

An object of this invention is to prevent an increase in image data while preventing degradation of the image quality caused by an image process in a digital image processing system. To achieve this object, a signal processing apparatus which quantizes pixel values within a pixel area having M (M is an integer of 2 or more) pixels into data of $2^N$ steps by N bits (N is a positive integer) expresses a decimal part of data in the entire pixel area by increasing or decreasing by one a predetermined number of pixel values among the M pixels on the basis of the decimal part of the data in the entire pixel area.

5 Claims, 5 Drawing Sheets

ENTIRE AREA LOOKS DARKER BY 0.25LSB.

0.25LSB SUBTRACTION
(SUBTRACTION OF 1LSB
FROM ONLY 25% OF ALL PIXELS
EQUALS TO SUBTRACTION OF 0.25LSB.)

PART OF DIGITAL IMAGE DATA
(UNIFORM BRIGHTNESS)

SIGNAL PROCESSING APPARATUS, SIGNAL PROCESSING METHOD, PROGRAM, AND STORAGE MEDIUM EMPLOYING RANDOM NUMBER GENERATION

FIELD OF THE INVENTION

The present invention relates to a digital image processing technique for a digital camera, digital video camera, and the like.

BACKGROUND OF THE INVENTION

A conventional image processing circuit for a digital still camera and the like adopts a configuration as shown in FIG. 1. In FIG. 1, an object image is formed on an image sensing element 104 via main photographing optical systems 102 and 103. Electrical signals from the image sensing element 104 are input to a CDS/AGC circuit to remove reset noise from the signals by a known method such as correlated double sampling. The resultant signals are input to an A/D conversion circuit 106, and sequentially converted pixel by pixel into digital signals with a predetermined bit width.

Outputs from the A/D conversion circuit 106 are input to a memory controller 115 via a selector 109 which selects a signal on the basis of a signal from an overall control CPU 100. The memory controller 115 transfers all signal outputs to a frame memory 116. In this case, all pixel data of each photographing frame are temporarily stored in the frame memory 116. In sequential shooting or the like, all data are written in the frame memory 116.

After the end of photographing operation, the contents of the frame memory 116 which stores photographing data are transferred to a camera DSP 110 via the selector 109 under the control of the memory controller 115. The camera DSP 110 generates R, G, and B color signals on the basis of respective pixel data of each photographing data stored in the frame memory.

Generally before photographing, the result is transferred to a video memory 111 periodically (for each frame), and displayed on the viewfinder or the like via a monitor display means 112.

When the photographer performs photographing operation by a manipulation to a camera operation switch 101, pixel data of one frame are read out from the frame memory 116 in accordance with a control signal from the overall control CPU 100. The pixel data are subjected to an image process by the camera DSP 110, and then temporarily stored in a work memory 113.

Data in the work memory 113 is compressed by a compression/decompression means 114 on the basis of a predetermined compression format, and the result is stored in an external nonvolatile memory 117 (a nonvolatile memory such as a flash memory is generally used).

To observe photographed image data, data compressed and stored in the external memory is decompressed into normal data of each photographing pixel by the compression/decompression means 114. The result is transferred to the video memory 111, and the image is displayed on the monitor display means 112.

In a general digital camera, an output from the image sensing element 104 is converted into actual image data via the process circuit in almost real time, and the result is output to the memory or monitor circuit.

Generally in this digital camera system, the black level of A/D-converted image data is not 0. In order to set the black level to 0, offset correction of subtracting a predetermined value from entire image data in a camera DSP or the like, or a digital image process such as digital OB clamping must be executed. In a conventional digital image process by the camera DSP or the like, addition/subtraction is done at the precision of the quantization step of the A/D conversion circuit, and the playback precision of the black level is low. Since the clamping level has only the precision of the quantization step in performing digital OB clamping at different clamping levels for respective horizontal lines of an image, horizontal line noise of the quantization step occurs.

Recently, the algorithms of digital image processes are becoming more advanced and more complicated along with the spread of digital cameras and digital image processes. As the image process becomes more complicated, accumulation of the quantization error (noise) is inevitable, as described above, and may greatly affect the image quality.

Conventionally, the influence of the quantization error on the image quality is reduced by expanding the number of bits by, e.g., adding 0 to lower bits of the bit string of image data or shifting the bit string to the left. However, this method leads to a large image data capacity, a large image processing circuit scale, and a low image processing speed. This method makes the design difficult as the number of pixels of image data increases year by year.

Some prior arts (e.g., Japanese Patent Laid-Open No. 9-284595) implement clamping at a precision equal to or lower than the quantization step in an analog image process after the clamping level is obtained from digital image data at a precision equal to or lower than the quantization step and converted into an analog voltage value by a D/A converter. However, the analog image process is essentially more susceptible to external noise than the digital image process. If noise is mixed during the clamping process, it affects the image quality. Since clamping is performed in the analog circuit, the degree of freedom for determining the image process order or clamping level decreases.

SUMMARY OF THE INVENTION

The present invention has been made to overcome the conventional drawbacks, and has as its object to prevent an increase in image data while preventing degradation of the image quality caused by an image process in a digital image processing system.

To solve the above problems and achieve the above object, according to the first aspect of the present invention, a signal processing apparatus which quantizes pixel values within a pixel area having M (M is an integer of not less than 2) pixels into data of $2^N$ steps by N bits (N is a positive integer) is characterized in that a decimal part of data in the entire pixel area is expressed by increasing or decreasing by one a predetermined number of pixel values among the M pixels on the basis of the decimal part of the data in the entire pixel area.

According to the second aspect of the present invention, a signal processing apparatus which obtains a level shift value having a precision higher than a quantization step of pixel data from the pixel data within a predetermined area of a digital image, wherein one quantization step is added to or subtracted from the pixel data at a probability corresponding to a part of the level shift value that is lower than the quantization step.

According to the third aspect of the present invention, there is provided a signal processing apparatus comprising: an image sensing element which senses an object image; and a digital clamping circuit which digitally clamps a signal from a photoelectric conversion portion of an area not shielded from light, on the basis of a signal from a photoelectrical conversion portion of a light-shielded area of the image sensing element, wherein a clamping level is calculated at a precision higher than a quantization step of image data, and one quantization step is subtracted from pixel data at a probability corresponding to data of the clamping level that is lower than the quantization step.

According to the fourth aspect of the present invention, a signal processing method of quantizing pixel values within a pixel area having M (M is an integer of not less than 2) pixels into data of $2^N$ steps by N bits (N is a positive integer), wherein a decimal part of data in the entire pixel area is expressed by increasing or decreasing, by one, pixel values of a predetermined number of pixels among the M pixels, on the basis of the decimal part of the data in the entire pixel area.

According to the fifth aspect of the present invention, a signal processing method of obtaining a level shift value having a precision higher than a quantization step of pixel data from the pixel data within a predetermined area of a digital image, wherein one quantization step is added to or subtracted from the pixel data at a probability corresponding to a part of the level shift value that is lower than the quantization step.

According to the sixth aspect of the present invention, a signal processing method of calculating a clamping level at a precision higher than a quantization step of image data, wherein one quantization step is subtracted from pixel data at a probability corresponding to data of the clamping level that is lower than the quantization step.

According to the seventh aspect of the present invention, a program causing a computer to execute the above method.

According to the eighth aspect of the present invention, a storage medium computer-readably storing the above program.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Figure 1:
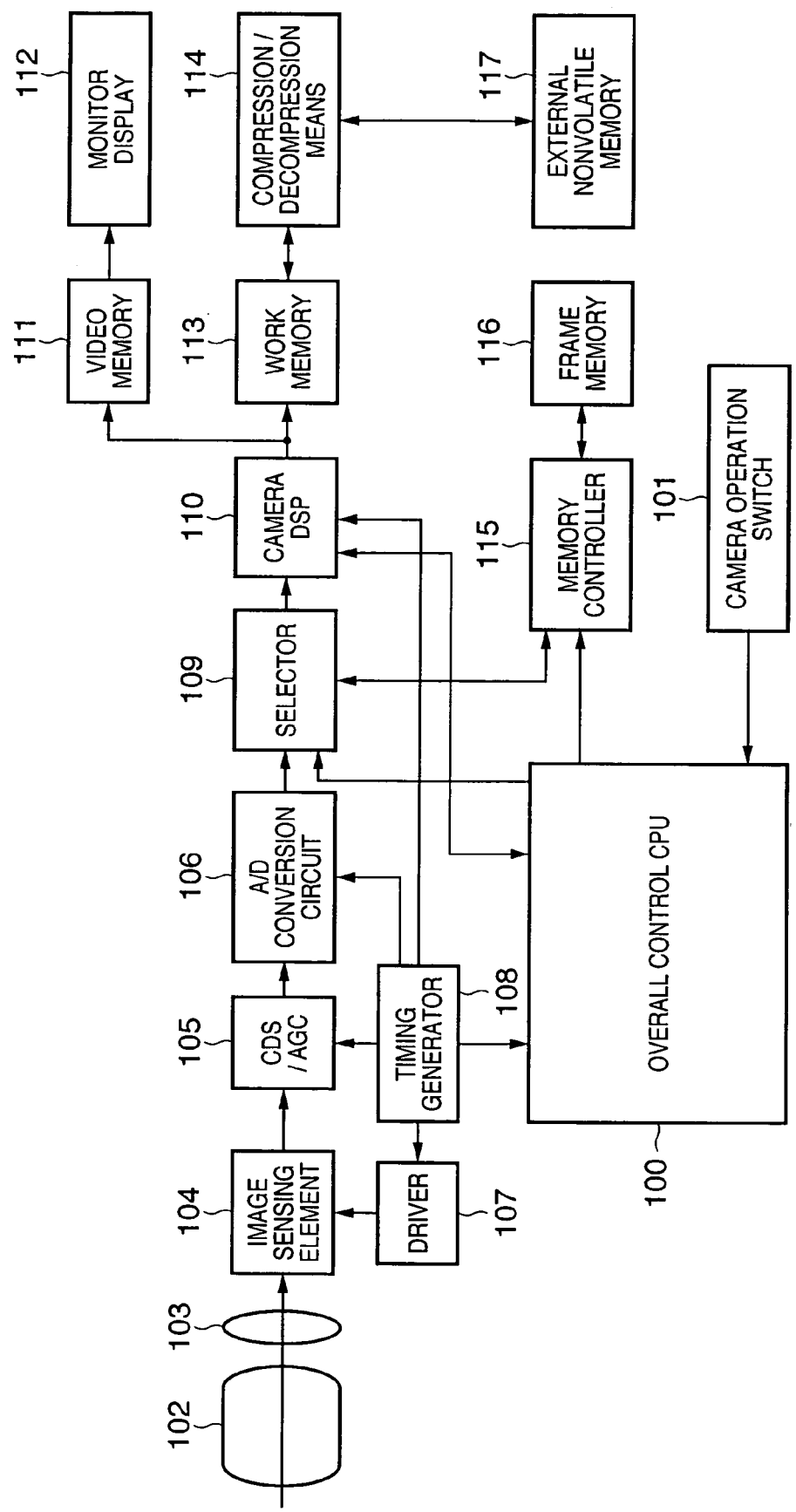
FIG. 1 is a block diagram showing the overall configuration of a conventional camera system.

Preferred embodiments of the present invention will be described below.

The outline of the embodiments will be explained.

The embodiments are related to a method of temporarily saving part of bit information to be reduced by an error diffusion process and suppressing degradation of the image quality caused by reduction of the bit width when the bit width of image data is reduced to decrease the data amount in storing data having undergone an image process in a storage means such as a frame memory or memory card in a case in which the number of quantization bits is increased for a high-precision digital image process in a digital image processing apparatus such as a digital camera or digital video camera, or the bit width increases due to a digital image process having a precision higher than the quantization step of image data.

The embodiments are also related to a method of performing a level shift process or digital clamping process at a precision higher than the quantization step of image data without increasing the bit width of image data by an error diffusion process.

In the embodiments, when lower bits of pixel data are to be cut, the quantization step is added to the reduced pixel data at a probability corresponding to data of lower bits to be cut.

For example, a predetermined random number having the same bit width as that of data of lower bits to be cut is generated, and compared with the data of lower bits to be cut. If the random number is smaller or equal, the quantization step is added; if the random number is larger, no quantization step is added. The quantization step can be added to reduced pixel data at a probability corresponding to the data of lower bits to be cut. If the number of lower bits to be cut is four and data is "1000" by a binary expression, the data is compared with a predetermined 4-bit random number, and the quantization step is added at a probability of 50%.

According to another aspect of the embodiments, when the level of digital image data is to be shifted, the level shift is performed by a general addition/subtraction circuit for a part, equal to or higher than the quantization step, of a level shift value having a precision higher than the quantization step. The quantization step is added/subtracted to/from a part lower than the quantization step at a probability corresponding to the data. In this manner, the level is shifted at a precision equal to or higher than the quantization step.

For example, when a 14-bit value having four bits as bit positions lower than the quantization step is to be subtracted from a given area of image data having 10 quantization bits, 10 bits equal to or higher than the quantization step are directly subtracted from the image data. As for the four bits lower than the quantization step, pixels are selected at random from the area at a ratio corresponding to the figure of the four bits, and one bit of the quantization step is subtracted from only the selected pixels. This means that the 14-bit value is equivalently subtracted from the 10-bit image data in the entire area. This method hardly increases the number of image data bits, and can implement subtraction at a precision equal to or lower than the quantization step of original image data without increasing the data capacity.

According to still another aspect of the embodiments, the clamping level is calculated at a precision higher than the quantization step of digital image data. Subtraction is done by a general integer subtraction circuit for part of the quantization step that is equal to or higher than the quantization step. The quantization step is subtracted from pixel data at a probability corresponding to data of the clamping level that is lower than the quantization step. As a result, clamping is executed at a precision higher than the quantization step.

For example, the average value of the black level area of image data having 10 quantization bits is calculated by 10-bit integral part+4-bit decimal part=14 bits to obtain the clamping level at a precision higher than the quantization step of original image data. The 10-bit integral part is subtracted by an integer subtraction circuit from an image area to be clamped. The number of quantization bits is subtracted from the pixels of the image area to be clamped at a probability corresponding to the value of the 4-bit decimal part. The digital clamping process can be done at a precision higher than the quantization step of an original image without increasing the data amount.

The embodiments of the present invention will be described in detail below with reference to the accompanying drawings.

First Embodiment

Figure 2B:
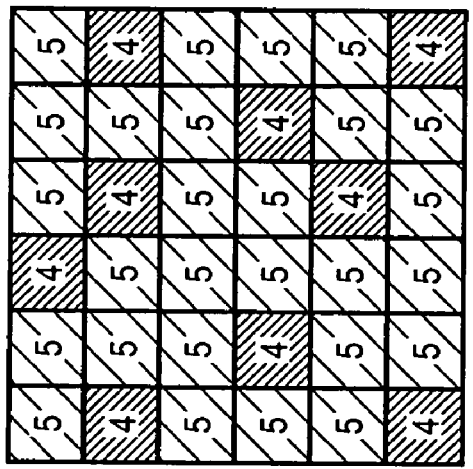
FIGS. 2A and 2B are views for explaining a principle according to the first embodiment of the present invention.
Figure 2A:
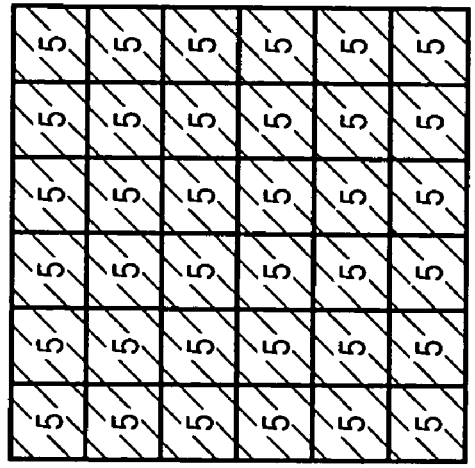

FIGS. 2A and 2B are views for explaining a principle according to the first embodiment of the present invention.

FIG. 2A is a view showing a partial area (6×6 pixels) of digital image data. A figure in each square (pixel) is image data representing the brightness of an image. The quantization step of image data is represented as LLSB by using a unit "LSB (Least Significant Bit)". For example, when the number of quantization bits of image data (the number of quantization steps) is eight, 256 brightness levels (e.g., 0LSB to 255LSB) can be expressed. That is, the image in FIG. 2A uniformly has a brightness of 5LSB.

FIG. 2B shows the result of subtraction from the image data in FIG. 2A at a precision equal to or lower than the quantization step (1LSB). In this case, 0.25LSB subtraction is exemplified.

Of 6×6=36 pixels, 25% of the pixels=9 pixels are selected at random, and LLSB is subtracted from them. This error diffusion process increases the number of quantization bits, and the brightness level of the entire image area seems to decrease by 0.25LSB without increase image data.

When pixels in FIGS. 2A and 2B are checked one by one, the brightness level of a given pixel does not change, and that of another pixel decreases by LLSB. The brightness level of one pixel does not decrease at a precision equal to or lower than the quantization step. However, the average brightness level of the entire area of interest is 5LSB in FIGS. 2A and 4.75LSB in FIG. 2B. The brightness level of the entire area decreases by 0.25LSB, and the image looks darker by 0.25LSB to the human eye. Subtraction can be equivalently executed at a precision equal to or lower than the quantization step (1LSB).

In general, the effect of making the entire area look as if the brightness level of the image were processed at a high precision is enhanced as the number of pixels of the image area subjected to addition/subtraction increases. FIGS. 2A and 2B illustrate a uniform-brightness image in which all pixel data that form the image area are equal to each other. However, for a general object whose brightness is not uniform, addition/subtraction can be equivalently performed at a precision equal to or lower than the quantization step.

Figure 3:
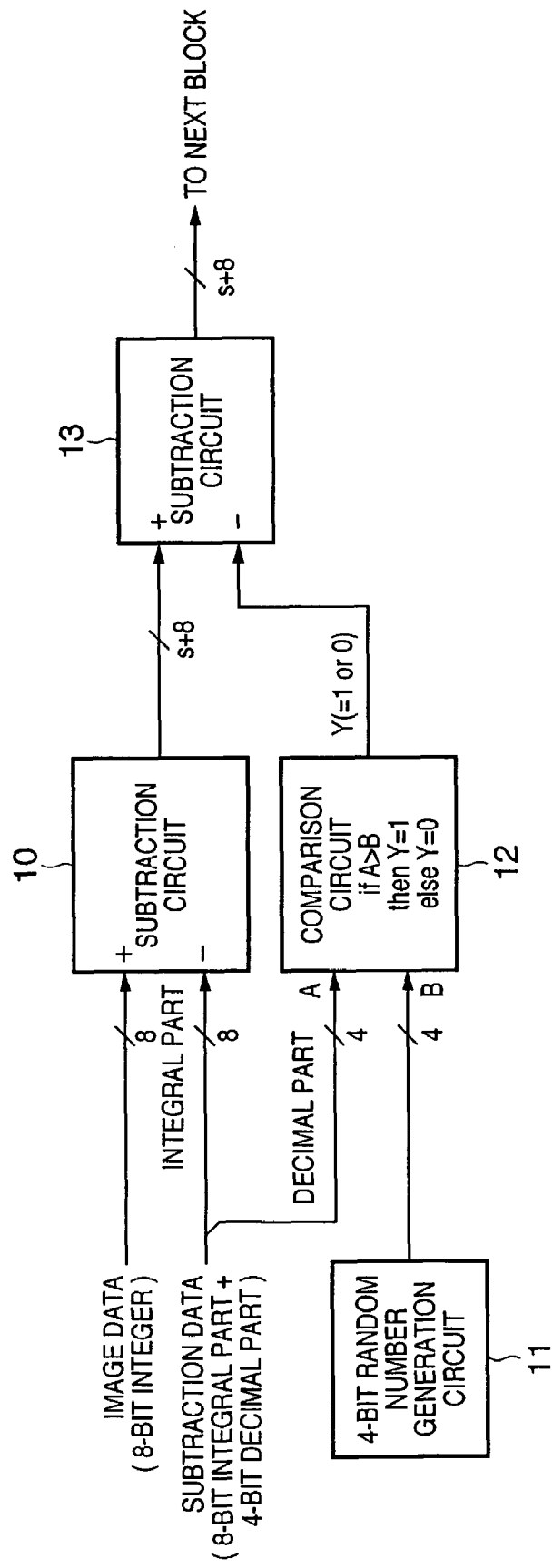
FIG. 3 is a block diagram showing an example of a circuit configuration according to the first embodiment.

FIG. 3 is a block diagram showing an example of a circuit configuration according to the first embodiment.

For example, image data of an area subjected to addition/subtraction is 8-bit integral data, and data having a precision of 8-bit integral part+4-bit decimal part=12 bits is subtracted from the image data. The integral parts of image data and subtraction data are input to a subtraction circuit 10, and subtracted by integer arithmetic. If no overflow occurs by arithmetic, the subtraction result has eight bits similarly to data before arithmetic. If overflow occurs due to arithmetic, one sign bit is added. The sign bit is represented by s, and the bits of the arithmetic result are represented by s+eight bits. The 4-bit decimal part of the subtraction data is input to a comparison circuit 12 together with a random number generated by a 4-bit random number generation circuit 11. The random number generated by the 4-bit random number generation circuit takes a value of 0LSB to 15LSB, and these values occur at almost the same probability.

The 4-bit random number generation circuit may be a known M-sequence random number generation circuit. Alternatively, the least significant bit of pixel data may be regarded as noise at which 0 and 1 appear equally, and the least significant bit of data of each of four pixels near a pixel of interest may be adopted as each bit value of 4-bit random number data, thereby generating one 4-bit random number. Alternatively, lower four bits of a pixel of interest or one pixel near the pixel of interest may be regarded as substantially noise data, and a random number may be generated from these four bits. In multitone image data of 10 bits or 12 bits, several lower bits, and especially the least significant bit are often noise components owing to noise of an image sensing element or analog circuit, noise generated by an A/D conversion circuit, or the like. The method of generating a random number from lower bits of image data can generate an almost uniform, preferable random number.

The comparison circuit compares a decimal part A of the subtraction data and a 4-bit random number B. If the decimal part A of the subtraction data is larger than the 4-bit random number B, a result Y of the comparison circuit 12 becomes 1; if B is equal to or larger than A, the result Y of the comparison circuit 12 becomes 0. When the 4-bit decimal part A of the subtraction data takes a value of 0LSB to 15LSB, the 4-bit random number B takes 16 values 0LSB to 15LSB at random. The probability at which the result Y of the comparison circuit 12 becomes 1 is A÷16. In other words, Y becomes 1 at a probability expressed by a numerical value of the decimal part of the subtraction data. The result Y of the comparison circuit 12 is input to a subtraction circuit 13, and further subtracted from the result of the subtraction circuit 10, sending the difference to the next block. Consequently, one is subtracted from an output from the subtraction circuit 10 at a probability expressed by the decimal part A of the subtraction data. This means that the integral part and decimal part A of the subtraction data are equivalently subtracted from entire image data of an area subjected to addition/subtraction. Subtraction data having a precision of 8-bit integral part+4-bit decimal part=12 bits can be subtracted from image data of an 8-bit integer.

If no overflow is caused by arithmetic, the number of quantization bits of original image data is equal to that of the subtraction result. Subtraction can be done at a precision higher than the quantization step of image data without increasing the image data. Even if overflow occurs due to arithmetic, image data increases by only one bit after arithmetic, and the amount increased from the image data amount before arithmetic is very small. By clipping the overflow part by a clipping circuit or the like, the data amount becomes equal to that of image data before arithmetic. Subtraction can be achieved at a precision higher than the quantization step of image data without increasing image data. In this case, an image is expected to hardly deteriorate by the clipping circuit.

Second Embodiment

The second embodiment of the present invention will describe a case in which addition/subtraction at a precision equal to or lower than the quantization step is applied to clamping operation in a digital image process. Clamping operation will be called digital clamping.

Figure 4:
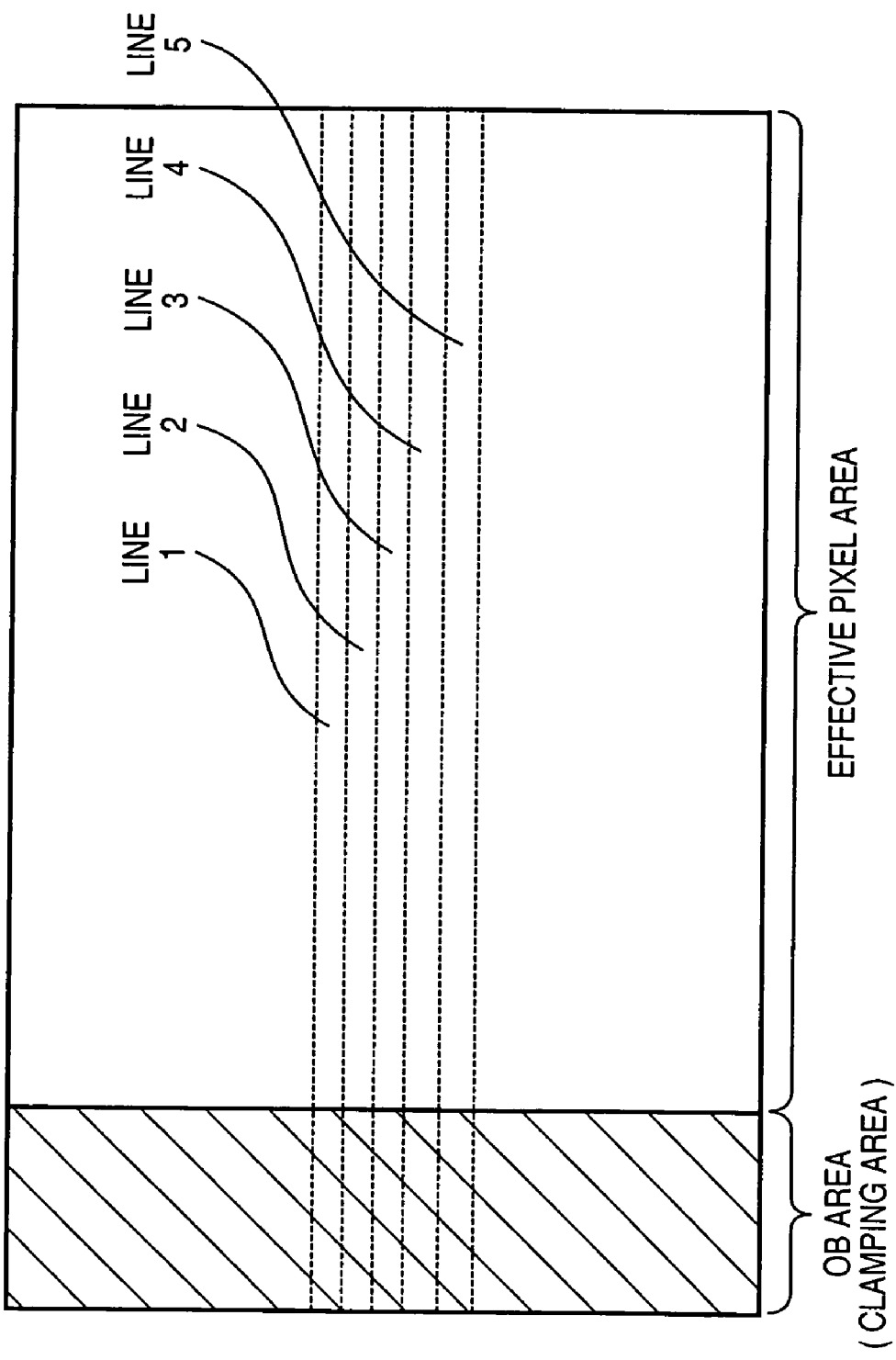
FIG. 4 is a schematic view of a captured image for explaining a digital clamping method according to the second embodiment of the present invention.

FIG. 4 is a schematic view of a captured image for explaining the digital clamping method.

An optical black (OB) area is set on the left side of the image, and represents the black level of the image. When attention is paid to a given line, the average of pixels in the OB area is defined as a clamping level. In digital clamping, the clamping level is subtracted from all effective pixels on the line.

Conventional digital clamping operation can perform subtraction at only the precision of the quantization step. The average of the clamping area can be calculated at a precision equal to or lower than the quantization step. However, the level varies between lines at the quantization step or more in subtraction. This appears as horizontal line noise on the image, degrading the image quality. For example, when the entire effective pixel area has a level of 10LSB, and the clamping level is 5LSB on line 1 and 4LSB on line 2, the effective pixels of line 1 exhibit 5LSB after digital clamping, and those of line 2 exhibit 6LSB. Line 1 and line 2 do not have any difference in the effective pixel level on the image before clamping, but suffer a difference of 1LSB after clamping owing to quantization error noise by digital clamping.

This quantization error noise in digital clamping can be greatly reduced by using addition/subtraction at a precision equal to or lower than the quantization step according to the second embodiment. For example, when addition/subtraction is performed at a precision of 0.1LSB, quantization error noise decreases to 0.1LSB which is smaller by 0.9LSB than noise generated when the second embodiment is not applied. This difference clearly appears as a difference in image quality, and digital clamping according to the second embodiment can provide a high image quality.

FIGS. 5A to 5D are graphs for explaining an example of detailed digital clamping operation according to the second embodiment.

FIGS. 5A to 5D pay attention to a given line of image data having 12 quantization bits. The length of the effective pixel area is 24 pixels, and the clamping level calculated by, e.g., obtaining the average of the OB area is 11.625LSB. The clamping level can be represented by a hexadecimal expression "00BA" using a 12-bit integral part and 4-bit decimal part. A case in which digital clamping is executed for 12-bit image data at a precision of 16 bits will be explained.

Figure 5A:
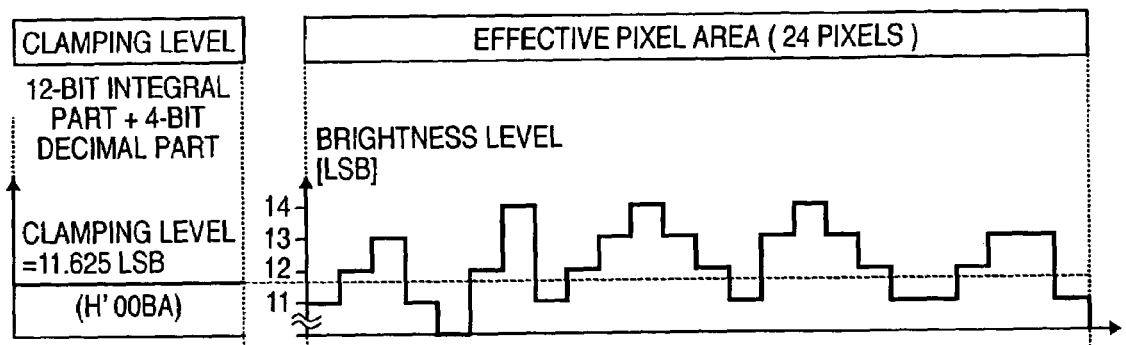
FIGS. 5A to 5D are graphs for explaining an example of detailed digital clamping operation according to the second embodiment.
Figure 5B:
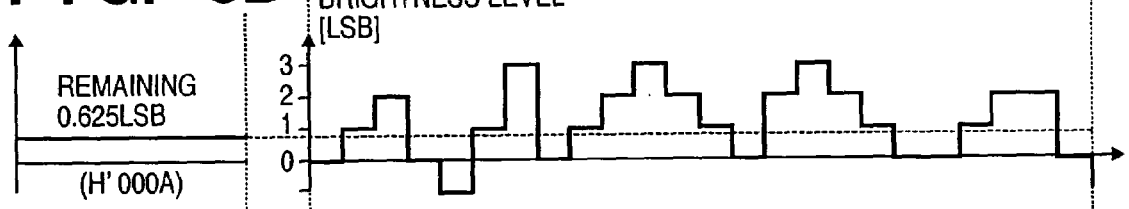
Figure 5C:
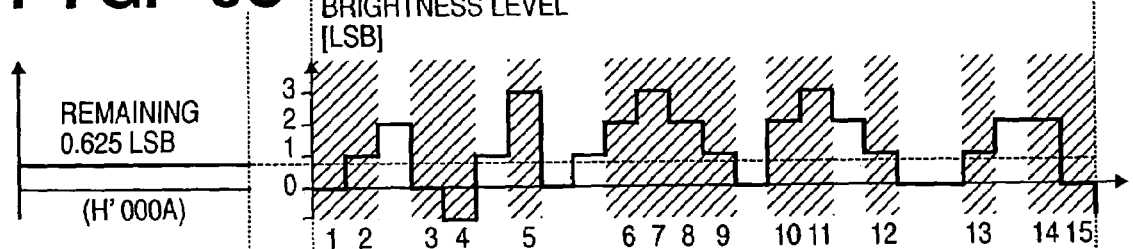
Figure 5D:
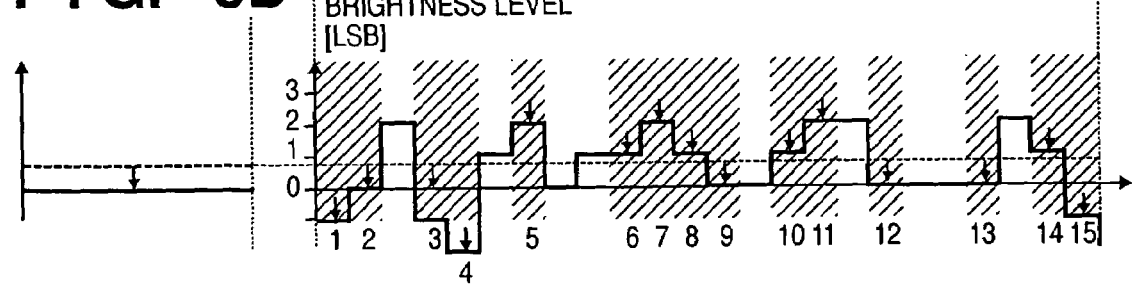

FIG. 5A shows the state of an original image, and FIG. 5B shows a state after the integral part "11LSB" of the clamping level is subtracted from the original image. In order to subtract the remaining 0.625LSB of the clamping level from the state of FIG. 5B, some of 24 pixels on one line are selected at a probability represented by the subtraction level (0.625LSB), that is, 62.5% of 24 pixels=15 pixels are selected by using a random number, as shown in FIG. 5C. The selected pixels are numbered pixels in FIG. 5C. Subtraction of LLSB from the selected pixels as shown in FIG. 5D means subtraction of 0.625LSB from one line. As a result, 11.625LSB can be equivalently subtracted from the state before digital clamping in FIG. 5A.

This operation is repeated by the number of lines of image data to perform digital clamping in which the image quality is hardly degraded by the quantization error in comparison with the conventional method.

As described above, according to the second embodiment, when a predetermined value is added/subtracted to/from a partial or entire area of digital image data, an error is diffused within the area. Addition/subtraction can be equivalently done in the entire area at a precision equal to or lower than the quantization step without increasing image data.

In an application of the addition/subtraction method to digital clamping, no horizontal line noise is generated by the quantization error. Clamping operation can be performed while the image quality is kept high.

In level shift of digital image data, a level shift value having a precision higher than the quantization step of the image data can be added/subtracted without increasing the image data capacity.

The clamping level can be calculated at a precision higher than the quantization step of image data, and digital clamping can be equivalently performed at a precision higher than the quantization step.

Other Embodiment

The object of the above-described embodiments is also achieved when a storage medium (or recording medium) which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the functions of the above-described embodiments are realized when an operating system (OS) or the like running on the computer performs some or all of actual processes on the basis of the instructions of the program codes.

Furthermore, the present invention includes a case in which, after the program codes read out from the storage medium are written in the memory of a function expansion card inserted into the computer or the memory of a function expansion unit connected to the computer, the CPU of the function expansion card or function expansion unit performs some or all of actual processes on the basis of the instructions of the program codes and thereby realizes the functions of the above-described embodiments.

The present invention is not limited to the above embodiments and various changes and modifications can be made within the spirit and scope of the present invention. Therefore, to apprise the public of the scope of the present invention the following claims are made.

What is claimed is:

1. A signal processing apparatus comprising:
   an image sensing element which senses an object image;
   a random number generating unit which generates, from lower bits of data of input pixel values, random numbers; and
   a digital clamping circuit which digitally clamps a signal from a photoelectric conversion portion of an area not shielded from light, on the basis of a signal from a photoelectrical conversion portion of a light-shielded area of said image sensing element,
   wherein a clamping level is calculated at a precision higher than a quantization step of image data, and
   one quantization step is subtracted from each pixel data of target pixels selected in accordance with a probability corresponding to data of the clamping level that is lower than the quantization step and the random numbers generated by said random number generating unit.

2. The apparatus according to claim 1, wherein the data of the clamping level that is lower than the quantization step and a predetermined random number are compared, and one quantization step is subtracted from pixel data at the probability corresponding to the data lower than the quantization step.

3. A signal processing method of calculating a clamping level at a precision higher than a quantization step of image data, wherein one quantization step is subtracted from each pixel data of target pixels selected in accordance with a probability corresponding to data of the clamping level that is lower than the quantization step and random numbers generated by a random number generating unit, wherein the random number generating unit generates, from lower bits of data of input pixel values, the random numbers.

4. The method according to claim 3, wherein the data of the clamping level that is lower than the quantization step and a predetermined random number are compared, and one quantization step is subtracted from pixel data at the probability corresponding to the data lower than the quantization step.

5. A storage medium computer-readably storing a program causing a computer to execute a signal processing method defined in claim 3.

* * * * *